United States Patent [19]

Ohlson

[11] Patent Number: 5,159,771
[45] Date of Patent: Nov. 3, 1992

[54] METHOD OF EXAMINING X-RAY FILMS AND THE LIKE AND AN EXAMINATION CABINET FOR SUCH FILM EXAMINATION

[76] Inventor: Carl-Eric Ohlson, Östermalmsgatan 7, Stockholm, Sweden, S-114 24

[21] Appl. No.: 465,113
[22] PCT Filed: Aug. 22, 1988
[86] PCT No.: PCT/SE88/00430
 § 371 Date: Feb. 23, 1990
 § 102(e) Date: Feb. 23, 1990
[87] PCT Pub. No.: WO89/02096
 PCT Pub. Date: Mar. 9, 1989

[30] Foreign Application Priority Data

Aug. 24, 1987 [SE] Sweden ................ 8703276

[51] Int. Cl.⁵ .................................. G02B 27/02
[52] U.S. Cl. .................................. 40/361
[58] Field of Search ............ 40/361, 362, 364, 366, 40/367; 352/129; 353/113, 112, 114, 118, DIG. 1, DIG. 5; 312/313; 108/152, 113, 112, 134

[56] References Cited

U.S. PATENT DOCUMENTS

| | | |
|---|---|---|
| 1,002,078 | 8/1911 | Paoli . |
| 3,456,372 | 7/1969 | Shoenfeld et al. ........... 40/361 |
| 3,813,797 | 6/1974 | Masters et al. ............. 40/361 |
| 3,895,865 | 7/1975 | Kaufman et al. ............ 353/26 R |
| 4,045,896 | 9/1977 | Adlon et al. ............... 40/367 |
| 4,118,654 | 10/1978 | Ohta et al. ................ 250/205 |
| 4,152,852 | 8/1979 | Brown . |
| 4,206,559 | 6/1980 | Brown .................... 40/361 |
| 4,331,398 | 5/1982 | Kawarada et al. ........... 353/113 |
| 4,368,964 | 1/1983 | Carlson . |
| 4,373,280 | 2/1983 | Armfield, III ............. 40/361 |
| 4,518,208 | 5/1985 | Marder .................... 312/209 |
| 4,527,347 | 7/1985 | Ohlson . |
| 4,572,081 | 2/1986 | Copeland ................. 108/112 |
| 4,578,887 | 4/1986 | Timpe et al. .............. 40/361 |

FOREIGN PATENT DOCUMENTS

| | | |
|---|---|---|
| 107043 | 5/1984 | European Pat. Off. . |
| 1196956 | 7/1965 | Fed. Rep. of Germany ........ 40/361 |
| 2039208 | 2/1972 | Fed. Rep. of Germany . |
| 2119373 | 2/1972 | Fed. Rep. of Germany . |
| 2061828 | 6/1972 | Fed. Rep. of Germany . |
| 2734121 | 11/1978 | Fed. Rep. of Germany ........ 40/361 |
| 2439923 | 5/1985 | Fed. Rep. of Germany . |
| 1175454 | 12/1969 | United Kingdom . |

Primary Examiner—Kenneth J. Dorner
Assistant Examiner—Brian K. Green
Attorney, Agent, or Firm—Jacobson, Price, Holman & Stern

[57] ABSTRACT

When examining X-ray film in an examination cabinet, the films are advanced consecutively in a horizontal direction from a magazine attached or capable of being attached to one side of the cabinet. The films are placed against each other in the magazine and are removed therefrom at least partly by a feed roller. Oppositely angled parts located on an endless transporting device engage the lower edges of respective films. After being examined, the films are delivered to a further magazine located on the other side of the cabinet. Located at one end of the cabinet is a ramp, on which is mounted a plurality of diodes which enable the various operations carried out in conjunction with the examination of X-ray film to be automated. The cabinet, magazine and transporting device can be constructed in the form of a module system. One of two modules can be placed above the other, and the modules can be adjusted angularly in relation to each other. The invention also relates to the examination cabinet itself.

12 Claims, 2 Drawing Sheets

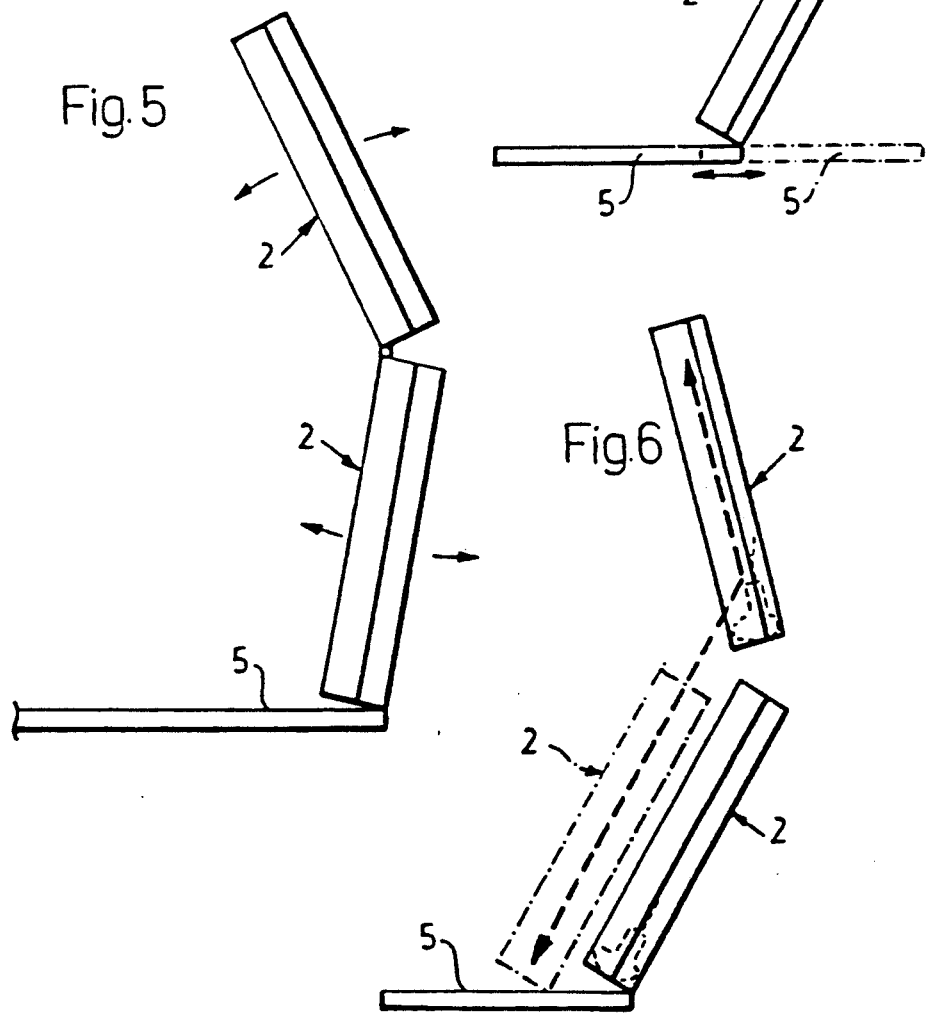

METHOD OF EXAMINING X-RAY FILMS AND THE LIKE AND AN EXAMINATION CABINET FOR SUCH FILM EXAMINATION

TECHNICAL FIELD

The present invention relates to a method of examining X-ray film and like image receptors in an examination cabinet of the kind which includes an illuminated surface and in which separate films are advanced consecutively in front of the illuminated surface and stopped in an examination position.

The invention can be applied to other types of receptors than for X-rays, such as film from image plates, ultra-examinations and MR-examinations for instance.

The invention also relates to X-ray film examining cabinets and cabinets for examining like film.

BACKGROUND PRIOR ART

Conventionally, X-ray film is examined and studied for diagnostic purposes by hanging the film manually in front of an illuminated surface in an illuminated cabinet. When a large number of films are to be examined, the films are normally hung on a plurality of transparent film frames which are positioned in front of the illuminated surface with the aid of a motor-driven conveyor mechanism.

The film frames are normally stored in magazines which may either be stationary or mobile. Moble magazines enable the frames to be conveyed between different film examining cabinets when the need arises.

Alternatively, and instead of film frame magazines, there may be used transparent plastic belts which are capable of being rolled in front of the illuminated surface in a horizontal or vertical direction.

The films are normally of a standard size, with a smallest dimension of 13×18 cm and a largest dimension of 35×43 cm. The film accommodating surface of the magazined film frames will normally be 150×50 cm in size.

A film frame magazine for use in an examination cabinet will normally have a capacity of 100–110 films. Some magazines, however, will accommodate 200–300 films having a maximum dimension of 35×43 cm.

When considering that the film frame requires a surface dimension which is about four times as large as the maximum film dimension and that about 75 films, each having a standard thickness of about 0.2 mm, can be packed depthwise within the standard or normal space between two film frames in a magazine, it will be seen that a film frame magazine demands the provision of much more space and the handling or manipulation of much heavier weight than when handling loose films. Such handling occurs, for instance, in the case of mobile routines in which the films are first hung in a cabinet for pre-examination purposes and then transported to another examination cabinet, where the films are examined and studied in greater detail.

The same also applies to the aforementioned plastic belts, which may be endless belts but which are often wound up in rolls for mobile transportation. In this respect, examination of the films can be beset with difficulties resulting from different types of operational disturbances, causing the films to be even less accessible than when stored in a frame magazine. This can have disastrous results, for instance, in catastrophic situations, or may require re-takes to be made, subjecting the patient to an increased dosage of radiation. The films are also easily deformed when rolling up the belts.

It is also known in the case of image projectors and like apparatuses to advance images sequentially from an image discharging magazine to an image examining or viewing position, and from there to an image receiving magazine.

One example of such apparatus is described and illustrated in U.S. Pat. No. 1,002,078 (Paoli). This publication describes a magic lantern in the form of a slide projector having a slide change mechanism which is effective in changing slides in a manner such that the images thereon will merge into each other without any abrupt demarcation therebetween.

Another known apparatus of the aforesaid kind is described and illustrated in U.S. Pat. No. 4,331,398 (Kawarada et al.). This publication teaches a device for transporting a plurality of slide film mounts in either direction between a pair of magazines in a slide projector with the aid of endless drive belts which extend over an open end of each magazine in close contact therewith and with stepped shoulder portions formed in the belt surface facing the open ends of the magazines.

U.S. Pat. No. 4,368,964 (Carlson) teaches a similar film-slide projector having an automatic slide changer and stationary magazine on each side of the projector, the respective slide magazines having a feed and discharge opening for slide frames which is located in the focal plane of the slide projector.

British publication 1 175 454 (Itek) describes a projector having a transparent film carrier mechanism which includes a supporting element and a positioning device for selective movement of the supporting element longitudinally or perpendicularly to the optical axis.

None of these known apparatuses, however, describes or illustrates the viewing of X-ray film, and consequently none discusses the problems particularly associated therewith. For instance, in all of the known apparatuses all films or slides to be viewed are of the same size, whereas films used for X-ray diagnosis normally vary in size, and the film sizes are considerably larger than the size of slides used in slide projectors.

Further examples of standard techniques German publications 2 039 208 (Agfa. Gevaert), 2 061 828 (Saab-Scania), 2 119 373 (Kalle) and 3 439 923 (Abels), and European publication 0 107 043 (MAP).

None of these publications, however, disclose any solution to the particular problems associated with X-ray diagnosis outlined above.

OBJECTS OF THE INVENTION

The objects of the present invention are to eliminate the above-mentioned and other drawbacks encountered with known film examining methods and film examining cabinets, to provide for more reliable and less space-consuming storage of X-ray films; to facilitate the work of the person studying the film and of other personnel, including the handling of heavy weights in conjunction with X-ray diagnostic procedures, and to enable the X-ray films for examination to be identified and checked positively, so that it is certain that a given X-ray image corresponds to a given patient's admission note.

One particular object of the invention is to shorten the film handling times in connection with the examination and study of X-ray films, so that the greater part of the overall time can be concentrated on the task of actually examining the films.

SUMMARY OF THE INVENTION

These and other objects of the invention are fulfilled by means of the inventive method, which is mainly characterized by introducing the films to be examined, one against the other, into a magazine located or locateable on one side of an illuminated surface, and advancing the films horizontally to the film examining position with the aid of a transporting device having means for gripping the films, preferably in an edge region thereof, and then preferably in the region of the bottom edge.

By inserting the films in this way into a magazine having external dimensions which slightly exceed the largest standard film size of 35×43 cm and which has a thickness corresponding generally to the thickness of the examination cabinet, it is possible to store about 400 films. This represents a considerable saving in space when compared with known magazine storage. The manual work involved in mounting the films in frames is also eliminated. Since the weight of such frames is quite considerable, it will be appreciated that their absence will greatly simplify the work involved in, for instance, transporting or conveying the films between different examination cabinets.

The magazine is also capable of storing mutually adjacent films of varying sizes without detrimental effect on the function of the examination cabinet. The X-ray images or films of a patient will often be of mutually different size, and the invention will consequently enable these films or images to be stored mutually adjacent one another and fed-out sequentially from the magazine to the illuminated surface. The size of the illuminated surface is suitably such as to enable a number of images to be studied simultaneously.

When practicing the inventive method, the gripping means will preferably be arranged to deliver films transported along the illuminated surface to a second magazine which is located on the other side of the surface, or capable of being located on the other side.

This second magazine may be used optionally to store the films upon completion of the examination or study.

The second magazine may, if desired, have the same configuration as the first magazine and may be mounted on the infeed side of the illuminated surface, subsequent to reversing the pack of film, to enable the films concerned to be re-examined.

Alternatively, all of the films in the second magazine may be removed therefrom and transferred, suitably packed, to a film storage location, for instance.

When both magazines are rigidly mounted on the illuminated cabinet, the films are inserted into the first magazine before commencing the examination or study.

The film transporting device is preferably movable in both directions, so that the device can be moved backwards when so desired.

In accordance with one preferred embodiment of the invention, film transportation is facilitated by moving the films into the gripping or engagement position by means of a rotatable feed roller which is arranged on one side edge of the magazine and which is preferably synchronized with the transporting device, so that the peripheral speed of the feed roller corresponds to the speed of the film transporting device.

The inventive method can be further developed in various respects, for the purpose of increasing reliability and of facilitating the work of the person examining the film. Thus, the film format is preferably determined, e.g. optoelectrically, as the film is transported to the examination position, and the resultant values are utilized, through a microcomputer, for causing the film to stop automatically in a pre-determined film examination position and to obtain automatic light collimation with the aid of movable light baffles or curtains.

To this end, there may be provided, adjacent the outfeed slot of the magazine, a ramp having arranged thereon a plurality of diodes for use in determining the format of the film concerned. The diodes may be provided in numbers corresponding to the number of standard film sizes used, enabling the size of each film discharged from the magazine to be readily determined. The system microcomputer is also supplied with values corresponding to the prevailing speed of the film transporting device and is able to produce, on the basis of these values, the control signals required for putting the aforesaid functions into effect.

Correspondingly, the diode ramp may also have arranged thereon one or more diodes which are effective in detecting the density of the film, i.e., the degree of blackening. This information is used, for instance, to control the light intensity of the cabinet light source. If the intensity of the light entering the cabinet is maintained at an optimal, even level in this way, the person examining the film will not become tired as a result of needing to, inter alia, adapt his sight to shifting light intensities, thereby enabling a diagnosis to be made more easily and more positively.

The inventive method also enables forward feed of the film to be combined with reading of text or bar codes, e.g. with the aid of an OCR-unit (Optical Character Reader) during passage of the film between magazine and examining position.

When applying the method in practice, preferably, two examination cabinets of module construction are used, together with associated magazines and film transporting devices, with one cabinet placed above the other, preferably with the possibility of adjusting the angle of the separate modules and/or displacing the upper module to a position in front of the lower module.

This arrangement of two modules enables a plurality of X-ray films to be studied simultaneously and facilitates comparison between individual images or series of images with mutual selective combinations or with synchronization between the two modules. This will afford a reliable ancillary for reaching a diagnosis or for instruction purposes.

Displacement of the upper module to a position in front of the lower module enables close-up studies to be made, if so desired.

In order to facilitate close study of the X-ray films, at least a part of the working table can be displaced horizontally and/or swung to a vertical position, in which a close study of the film located in the examination position can be made.

It is also possible within the concept of the invention to measure the height or thickness of the film pack, so as to be able to calculate and indicate the utilized or free capacity of the film magazine with the possibility of calibrating the detecting means, e.g., via a suitable potentiometer capable of being set for mutually different film thicknesses.

For instruction or demonstration purposes, it is also possible to project single images or a multiple set of images onto one or more TV-monitors. To this end, there can be used a stationarily or movably mounted video camera located in a suitable position in front of the illuminated surface. All of the films transported will, therefore, pass the camera without needing to take down the film or films to be projected onto the TV-monitor and place the film or films onto an illuminated surface intended for the camera and then re-hanging the film or films.

In accordance with another aspect, the invention also relates to a cabinet for examining or studying X-ray film and like image receptors.

An exemplifying embodiment of the invention will now be described in more detail with reference to the accompanying drawings.

BRIEF DESCRIPTION OF THE DRAWINGS

FIG. 2 is a sectional view taken on the line II—II in FIG. 1 and illustrates an end wheel of the film transporting device, showing the engagement or gripping means in a position for engagement with a film fed from the magazine.

FIG. 3 is a sectional view taken on the line III—III in FIG. 1, and illustrates the engagement or gripping means of the film transporting device during transportation of a film.

FIG. 4 is a side view of part of the examination cabinet illustrated in FIG. 1, and shows the arrangement of a horizontally displaceable table top.

FIG. 5 is a side view of an embodiment which is a slightly modified version of the embodiment illustrated in FIGS. 1 and 4 and which comprises two examination cabinets in the form of module units placed one on top of the other, with the possibility of adjusting the relative angle between the respective module units.

FIG. 6 illustrates an alternative arrangement of the units illustrated in FIG. 5, in which the upper unit can be displaced to a position in front of the lower unit, in order to enable a close-up study to be made of the film concerned.

DESCRIPTION OF PREFERRED EMBODIMENTS

Figure 1:
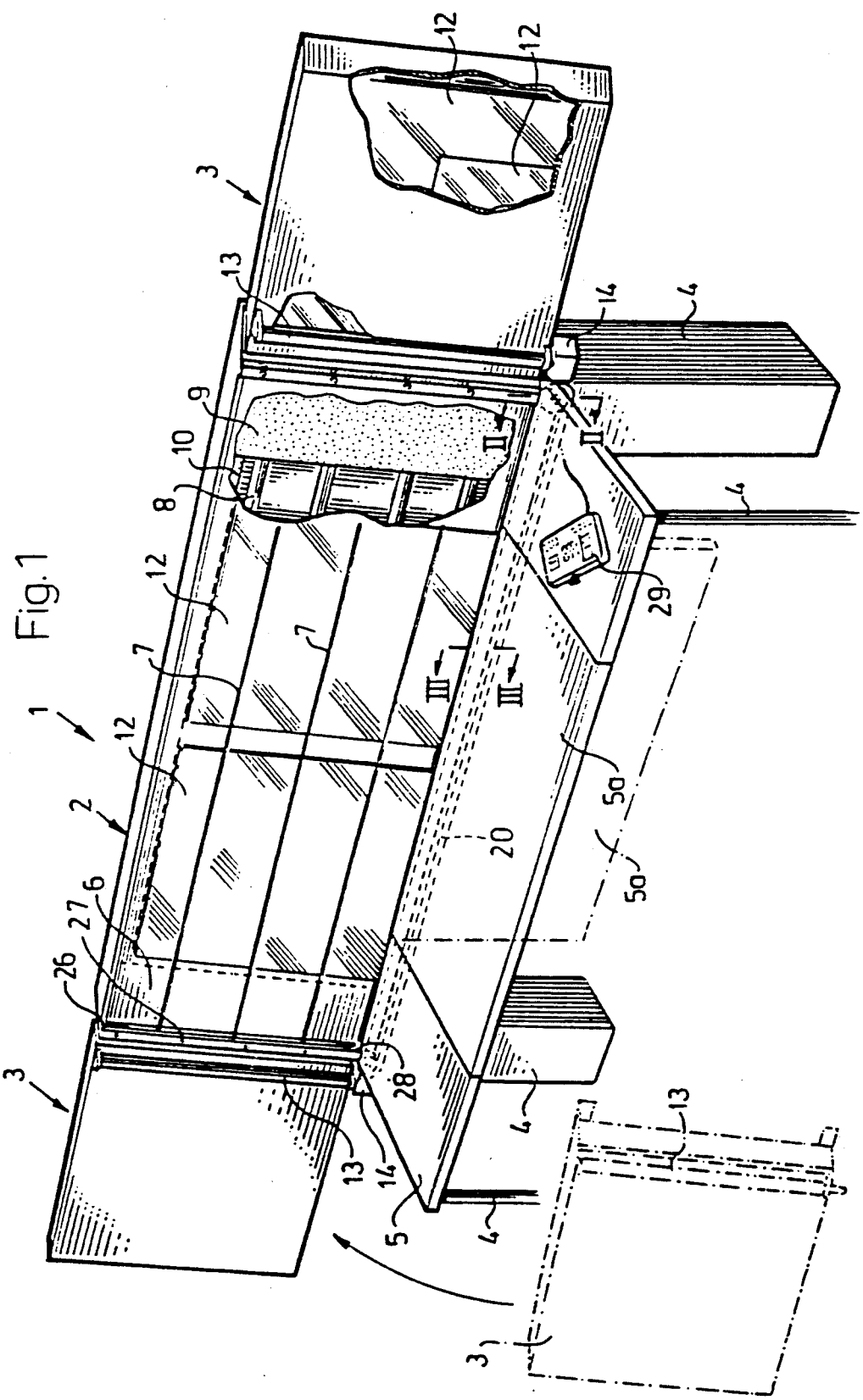
FIG. 1 is a perspective view of an inventive examination cabinet provided with exchangeable film magazines and a control panel.

An X-ray film examination cabinet comprises a module unit, generally referenced 1, having a central illuminated cabinet, generally referenced 2, which is flanked on both sides thereof by a respective X-ray film magazine, generally referenced 3.

The module unit 1 is supported on a stand 4, which also supports, in front of the cabinet, a working table 5 having a part 5a which can be swung down to a vertical position.

The illuminated cabinet 2 comprises a front, mat glass plate 6, in front of which there extend vertically adjustable guide devices in the form of nylon strips or bands 7 which are effective in guiding and retaining X-ray films 12 fed from one of the magazines 3. The cabinet 2 also includes a light source, in the form of one or more vapour discharge lamps 8 of adjustable light intensity.

The cabinet has mounted therein screening devices in the form of blinds 9, which can be moved from the sides of the cabinet towards the centre thereof, and a centrally located blind 10, which can be moved vertically up and down.

The X-ray films 12 are inserted in the magazine 3 in mutually contiguous relationship, the dimensions of the magazine slightly exceeding the dimensions of the largest standard film format, i.e., a format of 35×43 cm. Charging of the magazine can be effected at some other location, e.g. at the place where the films are developed and pre-examined, whereafter the charged magazine is transported to the cabinet and connected thereto.

A magazine having a thickness or depth which corresponds to the thickness or depth of the cabinet is able to accommodate about 400 films of varying format. Located on the side surface of the magazine facing towards the cabinet is an outfeed opening while arranged adjacent this opening is a film feed roller 13, which is driven by a motor 14 and engages the uppermost film in the magazine. The film is advanced some short distance by the feed roller, After which the film transport function is taken over by a film transporting device located beneath the cabinet, as hereinafter described.

The magazine 3 is provided with a sprung bottom plate, the resiliency of which ensures that the uppermost film is urged against the feed roller 13 irrespective of the number of films 12 remaining in the magazine.

The film transporting device includes an endless belt 20 which extends over rollers 21 journalled at respective ends of the cabinet.

The film transporting device is driven, via a gear-box, by the same drive source 14 as that which drives the feed roller 13, such as to be driven synchronously therewith, i.e. so that the speed of the transport belt 20 will correspond to the peripheral speed of the roller 13.

The transport belt 20 is made of an elastic material and includes oppositely angled parts 20a, which function as gripping means when a part of the belt 20 passes an end roller 21 provided with a V-shaped profile, whereupon oppositely and downwardly angled parts 20b of the belt are squeezed together such as to form an opening between the two upper, oppositely positioned parts 20a. The roller 13 is operative in feeding the lower edge of a film 12 into this opening and when the belt part in question subsequently leaves the roller 21, the parts 20a are moved together in gripping engagement with the bottom edge of the film 12, so that the film will be carried by the belt to a film examining position in front of the illuminated surface 6, where the belt is stopped to enable the film to be examined or studied.

Located on one side of the illuminated cabinet 2, adjacent the magazine 3, is a vertical diode ramp 26 having provided thereon a plurality of diodes 27 for determining the format of respective films, and one or more further diodes 28 for detecting the density or degree of blackening of the film. These diodes are intended to control the film transporting device 13, 14, 20, 21, the horizontally movable blinds 9 and the vertical movable blind 10, with the aid of a microcomputer, such that the images will take a correct position for examination on the screen and to also obtain a suitable screening, for instance to screen out light which might be distracting to the person carrying out the examination.

The diodes 27 also regulate the intensity of the light emitted by the light sources 8, such as to illuminate, in an optimum manner, those parts of the images to be studied. The ramp 26 also has mounted thereon an OCR-unit for reading the bar codes located on the lower part of the film, when such bar codes are present, therewith enabling the X-ray films to be reliably identified.

The film transporting device delivers films which have passed the illuminated surface 6 to a further magazine 3 located on the other side of the cabinet, this further magazine being similar to the firstmentioned magazine. When filled, this further magazine can be detached from the cabinet and replaced with an empty magazine.

Subsequent to emptying the magazine of film it may be refilled with a new batch of X-ray films and, subsequent to being turned 180°, used as an infeed magazine on the other side of the cabinet.

Alternatively, the infeed and outfeed magazines 3 may be fixedly attached to respective ends of the cabinet, in which case one magazine is filled with film prior to a film examining procedure and the other is emptied of film subsequent to said procedure.

As indicated in chain lines in FIG. 1, the central part 5a of the table 5 can be swung down to a vertical position. Located on the table 5 is a control panel 29, by means of which the film examiner manipulates the film conveying device 20 and carries out other requisite operations.

As illustrated in FIG. 4, the table 5 may alternatively or additionally be displaceable horizontally in a manner which will enable close-up studies of films to be made when necessary.

FIG. 5 illustrates schematically an embodiment of the invention which comprises two module units 1, each of which includes a respective film examination cabinet and which are placed one above the other and include a facility which will enable the cabinets to be angled in relation to one another, such as to bring respective cabinets to the best viewing or examining position. The various components of the module units, such as the film transporting devices, have not been shown for the sake of simplicity.

FIG. 6 illustrates schematically an alternative arrangement in which the upper module unit can be displaced to a position in front of the lower unit. This arrangement enables images or films on the upper module to be examined in the same position and at the same angle of inclination as the lower module, thereby providing for more positive diagnosis.

This movement of the module can either be effected manually, e.g. with the aid of a counterbalance arrangement or with the aid of a motor.

The aforesaid provision of an OCR-unit in conjunction with the diode ramp 26 will enable text or different bar code systems to be read-off, such codes and text being used to an increasing extent within hospital administration, for the purpose of registering patients and for providing immediate access to the medical history of a patient without needing to search manually through a conventional file system.

Thus, the X-ray films of a particular patient can be automatically collected and moved to a position in front of the illuminated surface 6 by deciphering the code in a computer at the place where the film is to be examined. Conversely, the requisite information relating to a particular patient can be extracted from a computer located at the working site, by deciphering the code at the same time as the film concerned is fed from the magazine 3.

In addition, the motor-driven film conveying device 20, 21 will preferably be adapted for manual drive, e.g. by mounting a crank on the shaft of the drive motor 14 of the feed roller 13, this crank at the same time enabling the transporting device 20 to be driven synchronously.

This arrangement will reduce the risk of time wasting in the event of an operational breakdown, for example, in a hospital emergency locality where a delay in making a diagnosis because film is not available may have disastrous results to the patient, in the worst case requiring the X-rays to be retaken.

As an alternative, the use of purely manually driven systems, i.e. systems not equipped with drive motors and associated automatic mechanisms, is conceivable in X-ray centres in which the equipment in general conforms, for instance, with the basic radiographic system recommended by WHO for developing countries.

One particular advantage afforded by the invention in comparison with known techniques in which the films are hung in frames is that the need to re-hang films is obviated, i.e. the task of removing examined films from the frames and hanging new films therein is no longer necessary. The present invention also provides a significant simplification when desiring to supplement a batch or array of sorted films with additional films or when it is desired to remove certain films from a set of films located, for instance, in a magazine.

It will be understood that the aforedescribed film examination method and cabinet can be modified within the scope of the following claims.

I claim:

1. In a method of examining X-ray film comprising the steps of providing an examination cabinet which includes an illuminated surface, advancing separate films consecutively in front of the illuminated surface, and stopping each of said separate films in a film examining position, the steps of:
   introducing separate films to be examined, one against the other, into a magazine which is attachable to one side of the illuminated surface;
   providing a transporting device for advancing said separate films from said magazine, the transporting device including a horizontally movable part with means for releasably gripping said separate films;
   moving said means for releasably gripping into contact with opposite surfaces of one of the separate films only in an edge region thereof when the one of the separate films is at least partly located in front of the illuminated surface; and
   moving said means for releasably gripping out of contact with said opposite surfaces of the one of the separate films after it has been examined.

2. A method according to claim 1, and further comprising the step of depositing films in a further magazine which is attachable to the other side of said surface.

3. A method according to claim 1, and further comprising the step of advancing the separate films to the means for releasably gripping by a rotatable feed roller located adjacent one side edge of the magazine by driving the feed roller at a speed which corresponds to the speed at which the separate films are advanced.

4. A method according to claim 1, and further comprising the step of providing an additional examination cabinet of modular construction, together with associated magazines and transporting devices, above the examination cabinet, said additional examination cabinet being capable of making angular adjustments.

5. A method according to claim 1, and further comprising the step of displacing at least part of a working table horizontally by swinging said part to a vertical position to enable a close-up study to be made of a film located in the examining position.

6. An examination unit for X-ray films comprising:
   a stand having a work table for a film examiner,
   a cabinet equipped with a light source and having a mat glass surface illuminated by said light source, a magazine attachable to the cabinet for receiving and supplying X-ray films to be examined, said magazine accommodating the X-ray films one against another and being attachable to one side of the cabinet, and a transporting device for advancing individual X-ray films consecutively from the magazine to the illuminated mat glass surface, the transporting device including a part which is horizontally movable, said part which is horizontally movable including means for releasably gripping the X-ray films by moving into and out of contact with opposite surfaces of the X-ray films only in a region near edge surfaces thereof and only when the X-ray films to be examined are located in front of the mat glass surface.

7. A cabinet according to claim 6, and further comprising a further magazine attachable to the cabinet, the transporting device delivering films which have been transported along said illuminated mat glass surface to said further magazine.

8. A cabinet according to claim 7, characterized in that each magazine is substantially identical to the other and can be exchanged for the other.

9. A cabinet according to claim 6, and further comprising a feed roller arranged along a side edge of the magazine located adjacent the cabinet, said feed roller being effective in advancing the films from a storage position in the magazine to a position for engagement with the means for releasably gripping said films, said feed roller having a peripheral speed corresponding to the speed at which the individual films are advanced.

10. A cabinet according to claim 6, and further comprising strip-like film guides extending horizontally along the illuminated mat glass surface.

11. An examination cabinet for X-ray films comprising:

a stand having a work table for a film examiner, a cabinet equipped with a light source and having a mat glass surface illuminated by said light source, a magazine attachable to the cabinet for receiving X-ray films to be examined, a transporting device for advancing individual X-ray films consecutively from the magazine to the illuminated mat glass surface, the magazine accommodating the X-ray films one against the other and being attachable to one side of the cabinet, the transporting device being horizontally movable and including means for releasably gripping the films in a region of an edge surface thereof, an endless movable belt, and terminal rollers beneath the cabinet about which the endless movable belt extends, the movable belt including elastic parts functioning as said means for releasably gripping, said elastic parts opening upon passage of the belt over said terminal rollers so as to subsequently close around the lower edge of a film fed from the magazine.

12. An examination cabinet for X-ray films comprising:

a stand having a work table for a film examiner, a cabinet equipped with a light source and having a mat glass surface illuminated by said light source, a magazine attachable to the cabinet for receiving X-ray films to be examined, and a transporting device for advancing individual X-ray films consecutively from the magazine to the illuminated mat glass surface, the magazine accommodating the X-ray films one against the other and being attachable to one side of the cabinet, the transporting device being horizontally movable and including (1) means for releasably gripping the films in a region of an edge surface thereof at least partly formed by an endless movable belt, and (2) terminal rollers beneath the cabinet about which the endless movable belt extends, the means for releasably gripping the films opening and closing around a lower edge of a film fed from the magazine at approximately a right angle relative to a direction in which the film is fed.

* * * * *